UNITED STATES PATENT OFFICE 2,110,849

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application June 21, 1937, Serial No. 149,473

18 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated by my process consists of a chemical compound characterized by the presence of: (a) at least one residue derived from a polyhydric alcohol sulfonic acid, (b) at least one residue derived from a polybasic carboxy acid, and (c) preferably but not necessarily, by the presence of a hydrocarbon radical or an oxyhydrocarbon radical or a carboxy hydrocarbon radical or the like.

Reference is made to my co-pending application for patent, Serial Number 149,472, filed June 21, 1937. Said co-pending application is concerned with a process for breaking oil field emulsions by means of chemical compounds of the formula type:

R.COO.T(OH)$_n$(SO$_3$Z)

in which R.COO is a carboxy acid radical derived from a detergent-forming carboxy acid, T(OH)$_n$ is a residue derived from a polyhydric alcohol of the kind which in unaltered form contains at least three hydroxyls, $n$ being the numeral one, two or three, and SO$_3$Z being the typical sulfonic acid radical, in which Z represents an ionizable hydrogen atom equivalent.

Typical of the compounds employed in the demulsifying process described in said co-pending patent application is one which may be prepared in the following manner:

180 parts of the sodium salt of glycerol sulfonic acid (sodium 1:2-dihydroxy propane 3-sulfonate, prepared by heating alpha-chlorohydrin derived from glycerol with aqueous Na$_2$SO$_3$ solution and subsequent removal of water) are heated at 150° to 225° C. for 6 hours with stirring, with 210 parts of the fatty acids from cocoanut oil, the water evolved in the reaction being allowed to escape and the fatty acids being returned to the reacting chamber by suitable reflux condensation. The product of this reaction is then purified by washing with cold ethyl alcohol or other low-boiling alcohol, or preferably by dissolving in hot ethyl alcohol, filtering to remove insoluble inorganic salts, or other insoluble matter and crystallizing from the alcoholic solution.

It is furthermore stated in said co-pending application, in describing the compounds employed as demulsifying agents, that said compounds need not be prepared from glycerol, but that it is obvious that other polyhydroxylated materials may replace glycerol provided that they contain at least three alcoholic hydroxyls. For instance, one could prepare the monochlorhydrin or the dichlorhydrin from diglycerol, which is an ether alcohol, and employ such material just as advantageously as a corresponding compound derived from glycerol. Similarly, one could prepare an ether alcohol from diglycerol and a monohydric alcohol, such as ethyl alcohol, and employ such ether alcohol in place of glycerol, provided that the compound contained at least three alcoholic hydroxyls and provided that it could be converted readily so as to yield a monochlorhydrin and a dichlorhydrin. Similarly, ether alcohols could be obtained by reaction between a glycol, such as ethylene glycol, propylene glycol, or the like, and glycerol. The ether alcohols so obtained could be converted into a monochlorhydrin or a dichlorhydrin and these materials employed in the manner previously described. It is understood that reference to a polyhydric alcohol or a polyhydric alcohol residue refers to the ether type as well as the non-ether type. Whenever it is intended to limit the meaning to polyhydric alcohol, as differentiated from polyhydric alcohol ethers, the expression "free from an ether linkage" will be employed.

Reference is made to U. S. Patent #1,988,835, to De Groote and Wirtel, dated January 22, 1935. Said patent contemplates a process for breaking petroleum emulsions of the water-in-oil type, which consists in subjecting the emulsion to the action of a demulsifying agent containing a sulfo-aliphatic ester of a fatty acid of the type

R''.COO(T.SO₃.Z), in which R'' is a fatty acid radical, COO is a carboxyl residue, T is the aliphatic residue, SO₃ is the conventional sulfonic acid residue, Z represents the acidic hydrogen atom of the sulfonic acid or its equivalent, and (T.SO₃.Z) replaces the carboxylic hydrogen.

I have found that excellent demulsifying agents can be prepared if a polybasic carboxy acid is substituted for the monocarboxy detergent-forming acid employed in the manufacture of demulsifying agents of the kind contemplated for use in the process just described in my said co-pending application or if substituted for the fatty acid in the manufacture of the demulsifying agent described in the aforementioned U. S. Patent #1,988,835. In other words, the sulfonic acid or the sulfonic acid salt derived from glycerol or from ethylene glycol in the case of ethionic acid (hydroxy ethyl sulfonic acid), is characterized in all instances by the presence of at least one alcoholiform hydroxyl or its equivalent. In actual practice isethionic is derived from ethylene or ethanol. See Organic Chemistry, Whitmore, 1937, p. 34 and 112. For instance, a labile halogen, such as a replaceable chlorine atom, may be the obvious equivalent of the hydroxyl radical. This is also true in respect to a hydrogen sulfate radical (HSO₄) in the case of ethionic acid.

It is well known that polybasic carboxy acids react readily with alcoholic bodies, such as monohydric alcohols, dihydric alcohols, trihydric alcohols and hydroxy fatty bodies, such as ricinoleic acid, triricinolein, etc., to produce various esters, including acid esters, in which there is a residual carboxyl. Such reactions take place readily on heating above the boiling point of water, and especially if a dry inert gas, such as carbon dioxide, is passed through the mixture to remove water which is formed during esterification. In some instances, as for example, in the production of phthalic acid esters, the anhydride can be used most advantageously in esterification. I have found that these conventional polybasic carboxy acid esterification processes, when applied to hydroxylated sulfonic acid bodies of the kind described, yield an ester which, as far as I know, is a new composition of matter, and which is very effective in breaking various oil field emulsions.

Although I prefer to use phthalic anhydride as the most desirable source of the polybasic carboxy acid, one may use other polybasic carboxy acids or their anhydrides, such as succinic, malic, fumaric, citric, maleic, adipic, tartaric, japanic, glutaric, diphenic, naphthalic, oxalic, pimelic, suberic, azelaic, sebacic, etc. Naturally a simple derivative of a polybasic acid, such as chlorophthalic acid, can be used as advantageously as phthalic acid itself, although there is no added advantage in the use of the more costly chemical compounds.

Reference has been made to the formation of salts from glycerol chlorhydrin by reaction with sodium sulfite. Needless to say, the reaction is not limited to the use of sodium sulfite but one may use potassium sulfite, ammonium sulfite, or sulfites derived from substituted ammonium compounds, that is, from amines such as monoamylamine, diamylamine, triamylamine, triethanolamine, dipropanolamine, benzylamine, cyclohexylamine, etc. In some instances, it may be possible to substitute sulfur dioxide gas in presence of a suitable base in place of the sulfite.

Generally speaking, I have found oxalic acid, maleic acid, and particularly phthalic acid to be the most suitable polybasic carboxy acids. As previously pointed out, phthalic acid is particularly desirable. The reason is that it is low in price and because esterification reactions can take place at a fairly high temperature without decomposition. Subsequently, although phthalic acid is employed, for purposes of illustration and for reasons of convenience, it is understood that any polybasic carboxy acid, and particularly any dibasic carboxy acid, may be employed.

After the hydroxy sulfonic acid or hydroxy sulfonic acid salt or the functional equivalent thereof, of the kind previously referred to has been combined with the polybasic carboxy acid, any residual ionizable hydrogen atom present in the sulfonic acid radical or present as part of the carboxyl radical may be permitted to remain so that the compound represents the free acidic form or else the product may be neutralized by means of a suitable base, or may be converted into an ester. Naturally, such neutralization or esterification could take place, prior to combination between the hydroxy sulfonic acid body and the dibasic carboxy acid. For example, ethyl hydrogen phthalate could be used instead of phthalic acid. It is understood that the compounds employed as demulsifying agents in the present process may be made in any convenient manner and are not limited to any particular method of preparation.

Briefly then, the ionizable hydrogen atom of the sulfonic acid radical or of the carboxyl radical may be converted into the salt by the usual neutralization reactions. One may produce an ammonium salt, potassium salt, or the substituted ammonium salt, such as an amine salt. Not only may the amines previously mentioned be employed, but one may also employ aniline, toluidine, xylidine, methyl aniline, dimethyl aniline, ethyl aniline, diethyl aniline, pyridine, piperidine, and the like. Butylamine, octylamine, etc., may be employed. The ionizable hydrogen atom of the sulfonic acid radical may be replaced by any suitable equivalent, and the ionizable hydrogen atom of the carboxylic acid radical or radicals may be replaced by the same equivalent or some other equivalent. Salts may be derived from polyvalent metals, such as calcium, magnesium, zinc, copper, iron, lead, manganese, etc.

In the simplest form, the anhydrous hydroxy sulfonic acid is esterified with a suitable polybasic acid, preferably a dibasic acid, such as phthalic acid. As has been previously pointed out, such acidic material may be used as such or after partial or total neutralization. If the product is neutralized until it is neutral to methyl orange, then the sulfonic hydrogen atom will be completely replaced, whereas the carboxylic hydrogen atom or atoms will still remain unchanged. I have found that the material may be employed in the form of a salt, provided that the total number of carbon atoms is at least eight. I have found that the most effective reagents, however, are of the type where at least one carboxylic hydrogen of the polybasic acid (and only one in the case of the dibasic carboxy acid) is replaced by an alcohol residue. The word "alcohol" is employed in the present sense, not only to mean ordinary alcohols, but also alcoholic bodies which may have present some other atom or radical, such as an ether linkage, in the case of ether alcohols, or a carboxyl radical, in the case of hydroxy acids. The acid ester derived, for instance, by reaction between the polybasic carboxy acid (and particularly a dibasic carboxy acid) and a salt of aliphatic sulfonic acid of the kind described, can be reacted with a large number of alcohols or combination of alcohols, including the following: Monohydric alcohols, such as propyl alcohol, butyl alcohol, amyl alcohol, hexyl alcohol, octyl alcohol, decyl alcohol, duodecyl alcohol, stearyl alcohol; unsaturated monobasic alcohols, such as oleyl alcohol; polyhydric alcohols, such as glycols, ethylene glycol, for example, glycerol, polyglycerols, etc.; ether alcohols, such as diethylene glycol butyl ether, etc.; polyhydric alcohols having at least one remaining free hydroxyl, in which one or more hydroxyl has been previously reacted with a suitable acid, such as monoricinolein, diricinolein, monostearin, mono-olein, or the equivalent bodies derived from glycols, polyglycols or polyglycerols; triricinolein, acid alcohols, such as hydroxy stearic acid, ricinoleic acid, polyricinoleic acid, etc.; polyhydric alcohols, in which one or more dibasic carboxy acid residues have been introduced, such as a phthalic acid residue, a maleic acid residue, an oxalic acid residue, etc. (such polyhydric alcohol bodies may be employed, providing a free hydroxyl remains); cyclo-alcohols, such as cyclobutanol, etc.; aromatic alcohols, such as phenol, cresol, xylenol, naphthol, etc.; aralkyl alcohols, such as benzyl alcohol; heterocyclic alcohols, such as furfuryl alcohol, abietyl alcohol, etc.; mixed isomeric forms of the various alcohols, such as mixed amyl alcohols, etc.

More than one alcohol residue may be introduced in various manners, as in the use of citric or acontic acid, and in such event they need not be derived from the same source, but may represent the similar alcohols derived from the same class or from dissimilar classes. Under certain circumstances alkylene oxides, such as propylene oxide, butylene oxide, ethylene oxide, may be used in the place of alcohols. Certain alcohols derived from terpene bodies may be employed. In some instances the formation of the acid need not be by the usual steps of esterification, but the alcohol may be changed into a reactive halide in which a labile halogen replaces the hydroxyl of the alcohol. In other cases the reaction may take place between the carboxyl hydrogen atom and a chlorhydrin derived from glycerol, or a similar chlorhydrin derived from some other polyhydric alcohol, such as di- or triglycerol, ethylene glycol, etc.

For sake of convenience, it may be desirable to refer to the salts of the aliphatic sulfonic acids, which are subsequently esterified, by specifying the metallic atom or the substituted ammonium radical which replaces the sulfonic hydrogen first, and then specifying the organic radical, which replaces the carboxylic hydrogen. In other words, if the hydroxylated aliphatic sulfonic acid of the kind described is esterified with a polybasic carboxy acid, and more particularly, with a dibasic carboxy acid, the ester so produced represents essentially a derivative of a dibasic acid, that is, a body having a sulfonic hydrogen atom which has been replaced, and also a carboxylic radical which can be replaced in any suitable manner, and particularly by an organic radical, such as the methyl radical, ethyl radical, propyl radical, etc. The convenience of this arbitrary form of nomenclature will become evident subsequently.

In the various examples and illustrations herein included, no effort is made to differentiate between isomers. In some instances it is perfectly obvious that more than one isomeric form may exist, and that the product obtained in commercial practice would be a mixture of isomers. One isomer is as acceptable as another, and it is not intended to differentiate between such isomers.

It has been my experience that when a sulfo-aliphatic radical and particularly a hydroxylated sulfo-aliphatic radical, is united with a low molecular weight polybasic carboxy acid, such as oxalic acid, that the resulting compound, provided that it contains less than eight carbon atoms, is not a particularly effective demulsifying agent. It is obvious that one can obtain compounds which are extremely water soluble. Generally speaking, low molecular weight and neutralization by means of alkylolamines such as triethanolamine, make for water solubility. Attaching a hydrophobe group, such as a group derived from octyl alcohol, decyl alcohol, oleyl alcohol, naphthenyl alcohol, etc., tended to make for water insolubility. Some compounds may show both oil and water solubility, and in some instances the compounds may show relatively little solubility in either oil or water.

Insofar that such a wide variety of materials may be produced, it is desired to point out general rules which may be followed as being helpful in producing the most effective and most suitable demulsifying agents from sulfo-aliphatic polybasic carboxy acid bodies of the kind described.

The following approximations will serve as valuable guides:

(a) If the sulfo-aliphatic polybasic carboxy acid body of the kind described, is water-soluble and combines with soluble calcium and magnesium salts to produce a precipitate, a very effective demulsifying agent is obtained;

(b) If the sulfo-aliphatic polybasic carboxy acid body of the kind described, is either water-soluble or water-insoluble, but does not react with calcium and magnesium salts to produce a precipitate in its state as employed, it should then be examined, after complete saponification with an excess of aqueous caustic soda or alcoholic potash. If such saponification liberates a material formerly combined in somewhat different form, as, for example, potassium stearate, sodium oleate, sodium naphthenate, potassium abietate potassium ricinoleate, sodium hydroxystearate, sodium salt of tripropylated naphthalene sulfonic acid, potassium salt of petroleum sulfonic acids, etc., then and in that event an effective reagent is obtained, even though the material did not happen to exhibit water softening properties until after saponification, or after alteration or decomposition, and then saponification. For purposes of classification, I will hereinafter refer to such class of compounds as described under rules (a) and (b) as the water softening type;

(c) The hydrophobe type of material is generally more effective than the extremely hydrophile type of material, i. e., between two compounds, one of which is soluble in water only, and the other which is soluble in oil and water, usually the type that is soluble in both oil and water is more effective, or in selecting between classes of materials which exhibit oil and water solubility and those which exhibit oil solubility only, or at least soluble in some hydrophobe solvent, such as propyl alcohol, propyl ether, benzol, etc., the latter type is more apt to be effective;

(d) In many instances the most valuable type of reagent is one which exhibits substantially no solubility, or at least a very limited solubility, in either water or in ordinary petroleum hydrocarbon solvents, such as straight run paraffinic gasoline, or straight run paraffinic kerosene. Thus, for example, as between two classes, one of which is extremely soluble in water, for example, and the other which is insoluble in water and insoluble in straight run paraffinic kerosene, the latter is usually more effective; and (e) Generally speaking, it is desirable that the reagent be of moderate molecular weight, based on unpolymerized material. Sometimes complex organic compounds are designated by a formula within the parentheses, followed by the sub letter n to indicate a polymerized form. Reference to molecular weight is made solely to the unpolymerized form, based on composition or formula and not on physical methods of measuring the molecular weight. For instance, if the sodium salt of hydroxy ethyl sulfonic acid is esterified with methyl acid oxalate, one obtains a compound of rather low molecular weight. This is also true of the sodium salt ethyl ester or sodium salt propyl ester. Such materials, which are of extremely low molecular weight, i. e., under 270, for example, are not as desirable or as effective as reagents of higher molecular weight. On the other hand, if a mole of glycerol sulfonic acid sodium salt (sodium 1:2-dihydroxy propane 3-sulfonate) is combined with two moles of phthalic acid and then esterified with two moles of triricinolein, one begins to obtain a material having a molecular weight of approximately 2500. If the molecular weight of such material is increased further by esterifying the free hydroxyls of the residual triricinolein radicals with dibasic acids, such as phthalic acid, one may obtain a compound whose molecular weight approximates 2700. These may be considered as the upper limit of the most effective compounds. Generally speaking, it is desirable to select derivatives within the molecular weight range of 270-2700, with about 330-1700 as the general optimum range.

It is to be noted that some of the most effective reagents obtainable for the purpose of demulsifying crude oil and derived from sulfo-aliphatic polybasic carboxy acid body of the kind described, may be hydrophobe in character and substantially unsuited for purposes for which many conventional wetting agents are intended. For example, some of the water-insoluble products subsequently described are entirely devoid of the properties which are absolutely essential to a wetting agent.

The following examples are included for purposes of illustration, so that the variety and scope of reagents employed for demulsification may be exemplified:

*Example I*

One mole of anhydrous glycerol sulfonic acid triamylamine salt is esterified with one mole of butyl acid phthalate.

*Example II*

One mole of anhydrous glycerol sulfonic acid triamylamine salt is esterified with two moles of amyl acid phthalate.

*Example III*

One mole of sodium isethionate is esterified with a mole of phthalic anhydride to yield a compound whose composition is indicated by the following formula:

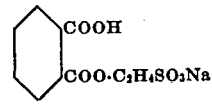

*Example IV*

One mole of the material prepared as in Example III, is esterified with one mole of ricinoleic acid.

*Example V*

One mole of the material prepared as in Example III, is esterified with one mole of monoolein.

*Example VI*

Two moles of material, prepared as in Example III, are esterified with one mole of monoolein.

*Example VII*

One mole of the material, prepared as in Example III, is esterified with one mole of mononaphthenin.

*Example VIII*

One mole of the material prepared as in Example III, is esterified with mono-abietin.

*Example IX*

One mole of the material prepared as in Example III, is esterified with stearyl alcohol.

*Example X*

One mole of the material prepared as in Example III, is esterified with a fatty acid amide derived from an alkylol amine. For preparation of amides from alkylolamines, such as diethanolamine, monoethanolamine, and the like, or from similar detergent-forming carboxy acids, such as naphthenic acid, abietic acid, etc., see method described in British Patent 450,672, dated July 17, 1936, to Orelup.

*Example XI*

One mole of the material prepared as in Example III, is esterified with monohydroxy ethyl toluene sulfonamide (see British Patent 455,694, to British Celanese Ltd., and W. H. Moss, dated 1936).

*Example XII*

Anhydrous glycerol sulfonic acid sodium salt is substituted for sodium isothionate in Example III to yield a compound of the following composition:

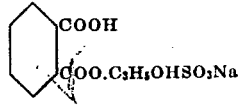

*Example XIII*

The material described in Example XII is used to replace the material described in Example III in the formation of compounds described in Examples IV–XI inclusive.

*Example XIV*

The material described in Example XII is esterified with one mole of oleic acid, naphthenic acid, abietic acid, or acetic acid.

Example XV

Materials of the kind described in Example XIV are used to replace the material described in Example III in the production of compounds as illustrated in Examples IV–XI inclusive.

Example XVI

Water soluble petroleum sulfo acids derived from "green" acids are converted into a corresponding sulfonchloride by action of phosphorus pentachloride, and then reacted with glycerol to give the corresponding dihydroxy ester. The compound thus formed is reacted with materials of the kind illustrated in Examples III, XII, and XIV.

Example XVII

Oil and water soluble petroleum sulfo acids derived from mahogany acids are treated in the same manner as indicated in Example XVI.

Example XVIII

Monobutyl naphthalene beta sulfonic acid is converted into a sulfonchloride and reacted with glycerol to give the corresponding dihydroxy ester. This product is then reacted in the manner described in Example XVI.

Example XIX

Glycerol as employed in Examples XVI, XVII, and XVIII is replaced by diglycerol.

Example XX

In the various preceding examples, where phthalic acid or the anhydride has been used, maleic acid or the anhydride is used instead.

Example XXI

Maleic acid compounds, of the kind described in Example XX, which may be rendered more water soluble by reaction of the sodium bisulfite so as to convert the same into sulfosuccinic acid, are so treated. For further description of this reaction, see U. S. Patent #2,072,085, to De Groote and Keiser, dated March 2, 1937.

Example XXII

In Examples IV, XIII, and XV above, ricinoleic acid is replaced by diricinolein.

Example XXIII

In Examples IV, XIII and XV above, ricinoleic acid is replaced by triricinolein.

Example XXIV

In Examples IV, XIII and XV above, ricinoleic acid is replaced by trihydroxystearin.

Example XXV

Xylene sulfonic acid is converted into the sulfonchloride and reacted with glycerol so as to give the dihydroxy ester. This material is reacted with materials of the kind described in Examples III, XII, and XIV.

In preparing the various reagents above described, certain monocarboxy, detergent-forming acids, such as the higher fatty acids, naphthenic acids, or abietic acids, are employed. These materials are characterized by the fact that they combine with alkalis, such as caustic soda, caustic potash, etc., to produce soap-like bodies. Hereinafter they will be referred to as detergent-forming monocarboxy acids.

Previously reference has been made to the introduction of a residue derived from butyl naphthalene sulfonic acid, triisopropyl naphthalene sulfonic acid, xylene sulfonic acid, or the like, into a molecule along with a sulfosuccinic acid residue. It is to be noted that other alkylated mono-cyclic or polycyclic acids may be employed, such as cymene sulfonic acid, cresol sulfonic acid, diamyl naphthalene disulfonic acid, monohexyl naphthalene sulfonic acid, dibutyl anthracene sulfonic acid, etc. High molecular weight alcohol sulfonic acid or sulfates, such as sulfo-cetyl alcohol, sulfo palmityl alcohol, etc., may be used in place of various alkylated aromatic sulfonic acids.

In order to summarize the chemical composition of the materials employed as demulsifying agents in the present process, it may be well to consider them in the following manner:

A polybasic carboxy acid may be indicated by the formula: $T(COOH)_n$ in which $n$ indicates the numeral two or more, although generally two, and T indicates the residue derived from the polybasic carboxy acid. A polyhydric alcohol may be indicated by the formula $D(OH)_n$, where $n$ similarly indicates the numeral two or more, but usually either two or three, and D indicates the alkyl or oxyalkyl residue, derived therefrom. $D(OH)_n$ can be converted into a chlorhydrin or a dichlorhydrin having the formula:

$$D(OH)_{n-n'}(Cl)_{n'}.$$

Such material may be reacted with sodium sulfite, so as to yield a material of the kind indicated by the formula $D(OH)_{n-n'}$—$(NaSO_3)$ 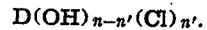 in which $n$—$n'$ is at least one, and usually either one or two.

As previously pointed out, other reactions such as reactions involving sulfuric acid or oleum and ethyl alcohol or ethylene, may be employed to produce an equivalent compound. The residue D is usually derived from glycerol, diglycerol, glycol, or diethylene glycol, or the like, and thus generally represents radicals such as $C_2H_4$, $C_3H_5$, $C_6H_{10}O$, $C_4H_8O$, etc. D may be the residue from an alcohol or ether alcohol having two or more hydroxyls. Where $n$—$n'$ represents two or more, it is possible that one of these hydroxyls is replaced by any acid radical without limitation. It may be a non-detergent carboxy radical, such as an acetate radical, or it may be an oleate radical, or it may be derived from a polybasic acid, such as phthalic acid or the like. Conveniently, then, the material may be indicated by $$D(OH)_m X_{m'''}(NaSO_3)$$

where $m$ indicates the numeral one, two or three, and generally one, $m'''$ is the numeral zero, one or two, and X indicates any acid residue, as previously indicated.

When a material of the kind just described combines with a polybasic carboxy acid indicated by the formula $T(COOH)_n$, then the product of reaction may be denoted as follows:

$$(HOOC)_{m'}T(COO)_{m''}D(OH)_{m'''}X_{m'''}(NaSO_3)_{m''''}$$

in which $m'$ denotes the numeral zero, one, or two; $m''$ denotes the numeral one or two, with the proviso that $m'$ plus $m''$ must always equal two or more; $m'''$ denotes the numeral zero, one, or two; and $m''''$ denotes the numeral one or two.

As previously pointed out, it is unnecessary that the sulfite be represented in the form of a sodium salt, and similarly, any carboxylic hydrogen may be replaced by any suitable equivalent.

Therefore, the previous formula can be rewritten:

in which all the characters have their previous significance, and Z represents an ionizable hydrogen equivalent.

In the preferred embodiment of my invention, the first occurrence of Z is a residue derived from an alcoholic body represented by B and $m''$ represents one, so that the formula may be rewritten:

$$(B.OOC)_{m'}T(COO)D(OH)_{m'''}X_{m'''}(Z.SO_3)$$

with the limitation that $m'$ represents at least one. As long as the reagent is obtained from a dibasic carboxy acid, $m'$ could be one and only one, and thus the composition may be indicated by the following formula:

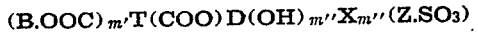

Stated another way, it may be said that the commonest forms of the formula

is either

or

Ordinarily speaking, D would represent a $C_2H_4$ radical or a $C_3H_5$ radical. If, in the last mentioned formula, X is derived from a monocarboxy detergent-forming acid, then said compound is typically of the water softening type previously mentioned. Where D is derived from ethylene, then the radical $D(OH)_{m''}X_{m'''}$ becomes $—C_2H_4—$. In event that the product is derived from glycerol, then $D(OH)_{m''}X_{m'''}$ becomes $—C_3H_5Y—$, where Y is either a hydroxyl radical or is the same as X. In such instances where Y is a hydroxyl radical, then $—C_3H_5Y—$ becomes $—C_3H_5OH—$.

B, as previously stated, is a residue derived from any hydroxy body of the kind previously illustrated. It may be an alcohol, such as stearyl alcohol; it may be a hydroxy acid, such as ricinoleic acid; it may be a polyhydric alcohol, such as ethylene glycol or glycerol; it may be a partially esterified polyhydric alcohol, such as mono-olein or the like; it may be a partially esterified alcohol obtained by reaction of the sulfonic acid of the kind previously described, consisting of a hydroxylated hydrophobe portion with or without the presence of some hydrophile radical, such as a sulfonic acid radical, and the like.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil etc. Alcohols, particularly aliphatic alcohols, such as methyl alcohol, ethyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited oil solubility and relatively limited water solubility. However, since such reagents are sometimes used in a ratio of 1 to 10,000, or 1 to 20,000, or 1 to 30,000, such an apparent insolubility in oil and water is not significant, because said reagents undoubtedly have solubility within the concentration employed. This same fact is true in regard to the material or materials employed as the demulsifying agent of my process.

In practising my process, a treating agent or demulsifying agent of the kind above described is brought into contact with or caused to act upon the emulsion to be treated in any of the various ways, or by any of the various apparatus now generally employed to resolve or break petroleum emulsions with a chemical reagent, or may be employed co-jointly in combination with other non-chemical processes intended to effect demulsification.

Having thus described my invention, what I claim as new and desire to secure by Letters Patent is:

1. A process for breaking petroleum emulsions of the water-in-oil type, which consists in subjecting the emulsion to the action of a demulsifying agent comprising a chemical compound having at least eight carbon atoms and of the kind obtainable by reaction between an alcoholic hydroxyl-containing aliphatic sulfonic acid body of the kind derived from a polyhydric alcohol and a polybasic carboxy acid body.

2. A process for breaking petroleum emulsions of the water-in-oil type, which consists in subjecting the emulsion to the action of a demulsifying agent comprising a chemical compound having at least eight carbon atoms and of the kind obtainable by reaction between an alcoholic hydroxyl-containing aliphatic sulfonic acid body of the kind derived from a polyhydric alcohol and a polybasic carboxy acid body, said compound being additionally characterized by the fact that it is within the molecular weight range of 270–2700.

3. A process for breaking petroleum emulsions of the water-in-oil type, which consists in subjecting the emulsion to the action of a demulsifying agent comprising a chemical compound having at least eight carbon atoms and of the kind obtainable by reaction between an alcoholic hydroxyl-containing aliphatic sulfonic acid body of the kind derived from a polyhydric alcohol and a polybasic carboxy acid body, said compound being additionally characterized by the fact that it is within the molecular weight range of 330–1700.

4. A process for breaking petroleum emulsions of the water-in-oil type, which consists in subjecting the emulsion to the action of a demulsifying agent comprising a chemical compound having at least eight carbon atoms and of the kind obtainable by reaction between an alcoholic hydroxyl-containing aliphatic sulfonic acid body of the kind derived from a polyhydric alcohol and a polybasic carboxy acid body, said compound being additionally characterized by the fact that it is within the molecular weight range of 330–1700, and being further characterized by the presence of an additional radical selected from the class consisting of hydrocarbon radicals, oxyhydrocarbon radicals and carboxy hydrocarbon radicals.

5. A process for breaking petroleum emulsions of the water-in-oil type, which consists in subjecting the emulsion to the action of a demulsifying agent of the water-softening type comprising a chemical compound having at least eight carbon atoms and of the kind obtainable by reaction between an alcoholic hydroxyl-containing aliphatic sulfonic acid body of the kind derived from a polyhydric alcohol and a polybasic carboxy acid body, said compound being additionally characterized by the fact that it is within the molecular weight range of 330–1700, and being further characterized by the presence of an additional radical selected from the class consisting of hydrocarbon radicals, oxyhydrocarbon radicals and carboxy hydrocarbon radicals.

6. A process for breaking petroleum emulsions of the water-in-oil type, which consists in subjecting the emulsion to the action of a demulsifying agent of the water-softening type comprising a chemical compound having at least eight carbon atoms and of the kind obtainable by reaction between an alcoholic hydroxyl-containing aliphatic sulfonic acid body free from an ether linkage and of the kind derived from a polyhydric alcohol and a polybasic carboxy acid body, said compound being additionally characterized by the fact that it is within the molecular weight range of 330–1700, and being further characterized by the presence of an additional radical selected from the class consisting of hydrocarbon radicals, oxyhydrocarbon radicals and carboxy hydrocarbon radicals.

7. A process for breaking petroleum emulsions of the water-in-oil type, which consists in subjecting the emulsion to the action of a demulsifying agent of the formula type:

$(Z.OOC)_{m'}T(COO)_{m''}$
$[D(OH)_{m'''}X_{m'''}(Z.SO_3)]_{m''''}$ in which T is a polybasic carboxy acid residue; D is a polyhydric alcohol residue; X is an acid residue; COO is the conventional carboxyl residue; $SO_3$ is the conventional sulfonic acid residue; Z is an ionizable hydrogen equivalent; $m'$ denotes the numeral 0, 1 or 2; $m''$ denotes the numeral 1 or 2 with the proviso that $m'$ plus $m''$ must always equal 2 or more; $m'''$ denotes the numeral 0, 1 or 2 and $m''''$ denotes the numeral 1 or 2, said compound being characterized by the fact that it contains at least eight carbon atoms.

8. A process for breaking petroleum emulsions of the water-in-oil type, which consists in subjecting the emulsion to the action of a demulsifying agent of the formula type:

$(Z.OOC)_{m'}T(COO)_{m''}$
$[D(OH)_{m'''}X_{m'''}(Z.SO_3)]_{m''''}$ in which T is a polybasic carboxy acid residue; D is a polyhydric alcohol residue; X is an acid residue; COO is the conventional carboxyl residue; $SO_3$ is the conventional sulfonic acid residue; Z is an ionizable hydrogen equivalent; $m'$ denotes the numeral 0, 1 or 2; $m''$ denotes the numeral 1 or 2 with the proviso that $m'$ plus $m''$ must always equal 2 or more; $m'''$ denotes the numeral 0, 1 or 2 and $m''''$ denotes the numeral 1 or 2, said compound being characterized by the fact that it contains at least eight carbon atoms, and is within the molecular weight range of 270–2700.

9. A process for breaking petroleum emulsions of the water-in-oil type, which consists in subjecting the emulsion to the action of a demulsifying agent of the formula type:

$(Z.OOC)_{m'}T(COO)_{m''}$
$[D(OH)_{m'''}X_{m'''}(Z.SO_3)]_{m''''}$ in which T is a polybasic carboxy acid residue; D is a polyhydric alcohol residue; X is an acid residue; COO is the conventional carboxyl residue; $SO_3$ is the conventional sulfonic acid residue; Z is an ionizable hydrogen equivalent; $m'$ denotes the numeral 0, 1 or 2; $m''$ denotes the numeral 1 or 2 with the proviso that $m'$ plus $m''$ must always equal 2 or more; $m'''$ denotes the numeral 0, 1 or 2 and $m''''$ denotes the numeral 1 or 2, said compound being characterized by the fact that it contains at least eight carbon atoms, and is within the molecular weight range of 330–1700.

10. A process for breaking petroleum emulsions of the water-in-oil type, which consists in subjecting the emulsion to the action of a demulsifying agent of the water-softening type comprising a compound of the formula type:

$(Z.OOC)_{m'}T(COO)_{m''}$
$[D(OH)_{m'''}X_{m'''}(Z.SO_3)]_{m''''}$ in which T is a polybasic carboxy acid residue; D is a polyhydric alcohol residue; X is an acid residue; COO is the conventional carboxyl residue; $SO_3$ is the conventional sulfonic acid residue; Z is an ionizable hydrogen equivalent; $m'$ denotes the numeral 0, 1 or 2; $m''$ denotes the numeral 1 or 2 with the proviso that $m'$ plus $m''$ must always equal 2 or more; $m'''$ denotes the numeral 0, 1 or 2 and $m''''$ denotes the numeral 1 or 2, said compound being characterized by the fact that it contains at least eight carbon atoms, and is within the molecular weight range of 330–1700.

11. A process for breaking petroleum emulsions of the water-in-oil type, which consists in subjecting the emulsion to the action of a demulsifying agent of the water-softening type comprising a compound of the formula type:

$B.OOC.T.(COO)D(OH)_{m'''}X_{m'''}(Z.SO_3)$ in which B is a residue derived from an alcoholic body; T is a polybasic carboxy acid residue; D is a polyhydric alcohol residue; X is an acid residue; COO is the conventional carboxyl residue; $SO_3$ is the conventional sulfonic acid residue; Z is an ionizable hydrogen equivalent; and $m'''$ denotes the numeral 0, 1 or 2, said compound being characterized by the fact that it contains at least eight carbon atoms, and is within the molecular weight range of 330–1700.

12. A process for breaking petroleum emulsions of the water-in-oil type, which consists in subjecting the emulsion to the action of a demulsifying agent of the water-softening type comprising a compound of the formula type:

$B.OOC.T.(COO)DX(Z.SO_3)$ in which B is a residue derived from an alcoholic body; T is a polybasic carboxy acid residue; D is a polyhydric alcohol residue; X is an acid residue; COO is the conventional carboxyl residue; $SO_3$ is the conventional sulfonic acid residue; and Z is an ionizable hydrogen equivalent.

13. A process for breaking petroleum emulsions of the water-in-oil type, which consists in subjecting the emulsion to the action of a demulsifying agent of the water-softening type comprising a compound of the formula type:

$$B.OOC.C_6H_4.(COO)DX(Z.SO_3)$$

in which B is a residue derived from an alcoholic body; D is a polyhydric alcohol residue; X is an acid residue; COO is the conventional carboxyl residue; $SO_3$ is the conventional sulfonic acid residue; and Z is an ionizable hydrogen equivalent.

14. A process for breaking petroleum emulsions of the water-in-oil type, which consists in subjecting the emulsion to the action of a demulsifying agent of the water-softening type comprising a compound of the formula type:

$$B.OOC.C_6H_4.(COO)C_3H_5X(Z.SO_3)$$

in which B is a residue derived from an alcoholic body; X is an acid residue; COO is the conventional carboxyl residue; $SO_3$ is the conventional sulfonic acid residue; and Z is an ionizable hydrogen equivalent.

15. A process for breaking petroleum emulsions of the water-in-oil type, which consists in subjecting the emulsion to the action of a demulsifying agent of the water-softening type comprising a compound of the formula type:

$$B.OOC.C_6H_4.(COO)C_3H_5X(Z.SO_3)$$

in which B is a residue derived from an alcoholic body; X is a monocarboxy detergent-forming acid residue; COO is the conventional carboxyl residue; $SO_3$ is the conventional sulfonic acid residue; and Z is an ionizable hydrogen equivalent.

16. A process for breaking petroleum emulsions of the water-in-oil type, which consists in subjecting the emulsion to the action of a demulsifying agent of the water-softening type comprising a compound of the formula type:

$$B.OOC.C_6H_4.(COO)C_3H_5X(Z.SO_3)$$

in which B is a residue derived from an alcoholic body; X is a fatty acid residue; COO is the conventional carboxyl residue; $SO_3$ is the conventional sulfonic acid residue; and Z is an ionizable hydrogen equivalent.

17. A process for breaking petroleum emulsions of the water-in-oil type, which consists in subjecting the emulsion to the action of a demulsifying agent of the water-softening type comprising a compound of the formula type:

$$B.OOC.C_6H_4.(COO)C_3H_5C_{17}H_{32}OH(Z.SO_3)$$

in which B is a residue derived from an alcoholic body; COO is the conventional carboxyl residue; $SO_3$ is the conventional sulfonic acid residue; and Z is an ionizable hydrogen equivalent.

18. A process for breaking petroleum emulsions of the water-in-oil type, which consists in subjecting the emulsion to the action of a demulsifying agent of the water-softening type comprising a compound of the formula type:

$$B.OOC.C_6H_4.(COO)C_3H_5C_{17}H_{32}OH(Na.SO_3)$$

in which B is a residue derived from an alcoholic body; COO is the conventional carboxyl residue; and $SO_3$ is the conventional sulfonic acid residue.

MELVIN DE GROOTE.